United States Patent [19]

Laurer et al.

[11] 4,344,152
[45] Aug. 10, 1982

[54] BUFFER MEMORY CONTROL CIRCUIT FOR LABEL SCANNING SYSTEM

[75] Inventors: George J. Laurer; Charles M. Pierce, both of Raleigh, N.C.

[73] Assignee: International Business Machines Corp., Armonk, N.Y.

[21] Appl. No.: 98,461

[22] Filed: Nov. 29, 1979

[51] Int. Cl.³ .............................................. G06F 7/28
[52] U.S. Cl. .............................. 364/900; 235/92 DP; 235/436; 340/146.3 Z
[58] Field of Search ............... 340/146.32 H; 235/436, 235/463, 437, 92 DP, 92 SH, 92 PE; 364/200 MS File, 900 MS File

[56] References Cited

U.S. PATENT DOCUMENTS

| | | | |
|---|---|---|---|
| 3,752,958 | 8/1973 | Gilberg et al. | 235/436 |
| 3,909,787 | 9/1975 | Laurer et al. | 340/146.3 Z |
| 4,086,477 | 4/1978 | Cowardin et al. | 340/146.3 Z |
| 4,147,295 | 4/1979 | Nojiri et al. | 340/146.3 Z |
| 4,298,954 | 11/1981 | Bigelow et al. | 364/900 |

FOREIGN PATENT DOCUMENTS 2206016  5/1974  France.

OTHER PUBLICATIONS

L'Onde Electrique, vol. 44, No. 446, pp. 535-543, May 1964, "Analyseur Multiparametrique".
Datamatron, vol. 6, No. 1, pp. 8-14, Jan./Feb. 1960, "The RW-100-A New Polymorphic Data System".

Primary Examiner—Joseph M. Thesz
Attorney, Agent, or Firm—Gerald R. Woods

[57] ABSTRACT

A scanning system includes a pair of buffer memories for alternately accumulating strings of signals which may contain bar coded label data. Candidate selection logic circuits examine incoming signals to generate a candidate signal when a string of signals satisfies gross logical tests. A control counter responds to the incoming signals and to the candidate signal to select an alternate buffer memory only when the active memory is fully loaded and contains at least part of a label candidate. The contents of the fully loaded memory are transferred to a processor for further analysis while incoming signals are routed to the alternate memory.

9 Claims, 4 Drawing Figures

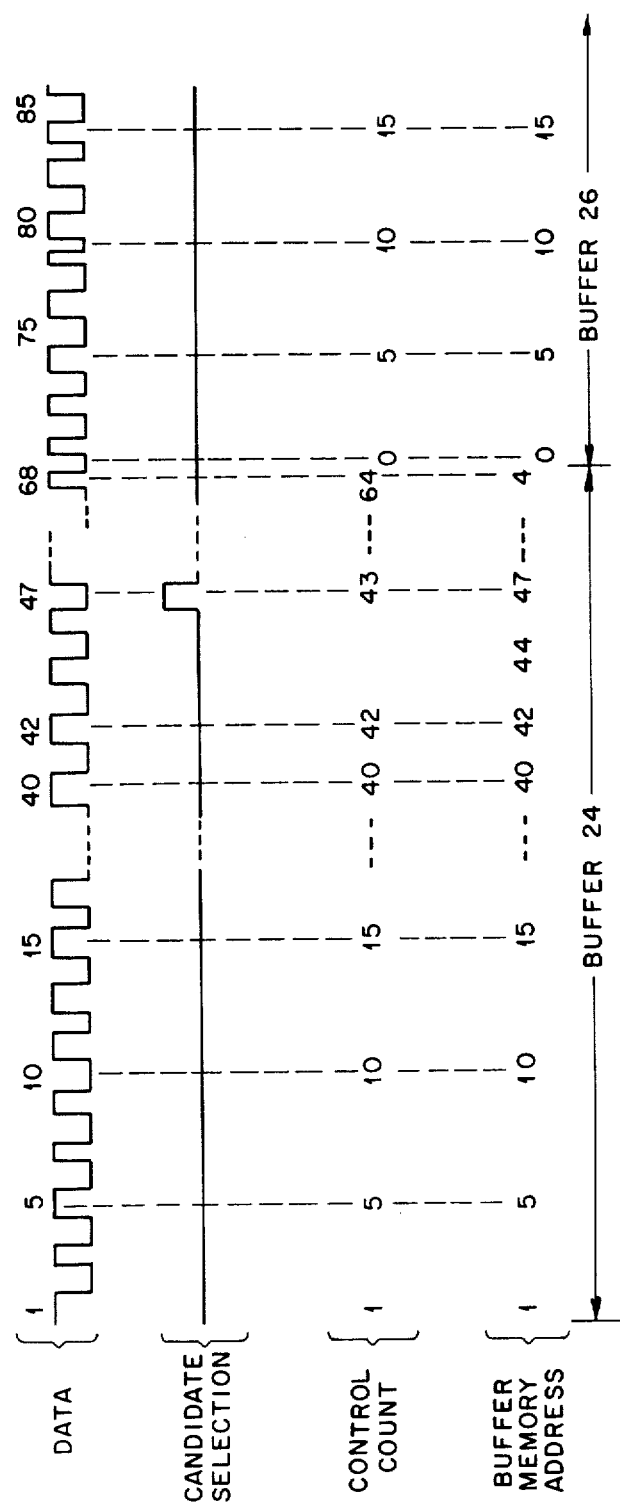

BUFFER MEMORY CONTROL CIRCUIT FOR LABEL SCANNING SYSTEM

TECHNICAL FIELD

The present invention relates to optical scanning systems and more particularly to a buffer memory control circuit for use in such systems.

PRIOR ART

A well known type of scanner for reading Universal Product Code (UPC) or similar bar-coded labels causes the product carrying the label to be repeatedly swept by a beam of coherent light as the product crosses a viewing window. Light which is reflected back through the window changes in intensity as a function of the reflectivity of the surface area struck by the beam. When converted to its electrical analog by a photomultiplier tube or photodiode, the reflected signal is an irregular sinusoid having positive and negative peaks. The lengths of the positive and negative segments of the signal are proportional to the widths of the light and dark bars of the label when the beam is actually traversing the label.

The task of reading a bar-coded label is complicated by the fact that the product surface which carries the label also typically carries relatively large amounts of printed matter and graphic material. When scanned, the print symbols and graphics also cause irregular sinusoidal signals to be generated. The scanner must be able to distinguish between label-defining sinusoidal signals and the meaningless sinusoidal signals generated when print symbols and graphic material are scanned.

To minimize the amount of raw data that must be decoded, systems include candidate selection circuitry which examines scanner signals one word at a time as those signals are being loaded into a buffer memory. When the examination indicates that the buffer memory contains a label candidate, the buffer contents are gated to a processor usually by means of an interrupt routine for further analysis. The emptied buffer is then loaded with newly received scanner signals. The logical tests performed by the candidate selection logic circuits are gross in nature; that is, less rigorous than tests performed by the processor. By limiting the candidate selection logic circuits to the performance of gross logical tests, the cost of the candidate selection hardware can be reduced. More importantly, the use of gross tests reduces the chances that a valid label wil go unrecognized.

However, because the candidate selection process is gross in nature, it is possible that false or conflicting candidates will be identified.

If the scanner is to be used exclusively to read a single type of bar-coded label, the candidate selection hardware can be designed to handle false or conflicting candidate designations. There are, in fact, several different active and proposed bar-coded formats, including different UPC versions and different versions of the EAN (European Article Number) codes.

While it is theoretically possible to design different candidate selection circuits, each of which would be dedicated to testing for one and only one code, the cost of this approach makes it highly unattractive.

An alternative would be to perform minimal or no gross tests. All or most of the raw data provided by the scanner would be transmitted to a processor for rigorous analysis. The drawback to this approach is that a considerable amount of processor time would be devoted to sifting through vast amounts of mostly meaningless raw data in order to isolate the relatively small amounts of valid label data generated during operation of the scanner. Since the processor is typically used to perform other supervisory or computational tasks in addition to the decoding task, the response time of the system would necessarily be degraded. To achieve an acceptable response time, a costly and more powerful processor would probably be necessary.

SUMMARY OF THE INVENTION

The present invention is a buffer memory control circuit which saves all possible label candidates identified by candidate selection logic circuitry for later transfer to a processor while discarding most of the meaningless raw data generated by the scanner. The circuit reduces the processor time required for further analysis and decoding.

A control circuit constructed in accordance with the present invention is used in combination with a plurality of data storage devices, a selected one of which is always active; that is, conditioned to store serially-received data units. The control circuit includes means for exmaining the serially-activated data units to generate a candidate signal when a first number of data units satisfies predetermined criteria. The control circuit further includes means for counting data units up to the first number and for maintaining that count unless or until a candidate signal is generated. A switching means responds at a second count greater than the first count to condition a previously inactive data storage device to receive subsequent data units. Data stored in the previously active data storage device is transferred to a processor for further analysis.

BRIEF DESCRIPTION OF THE DRAWINGS

While the Specification concludes with claims particularly pointing out and distinctly claiming that which is regarded as the present invention, details of a preferred embodiment of the invention may be more readily ascertained from the following detailed description when read in conjunction with the accompanying drawings wherein:

FIG. 4 is a graph of waveforms and counts generated during detection of a single label candidate.

DETAILED DESCRIPTION

Figure 1:
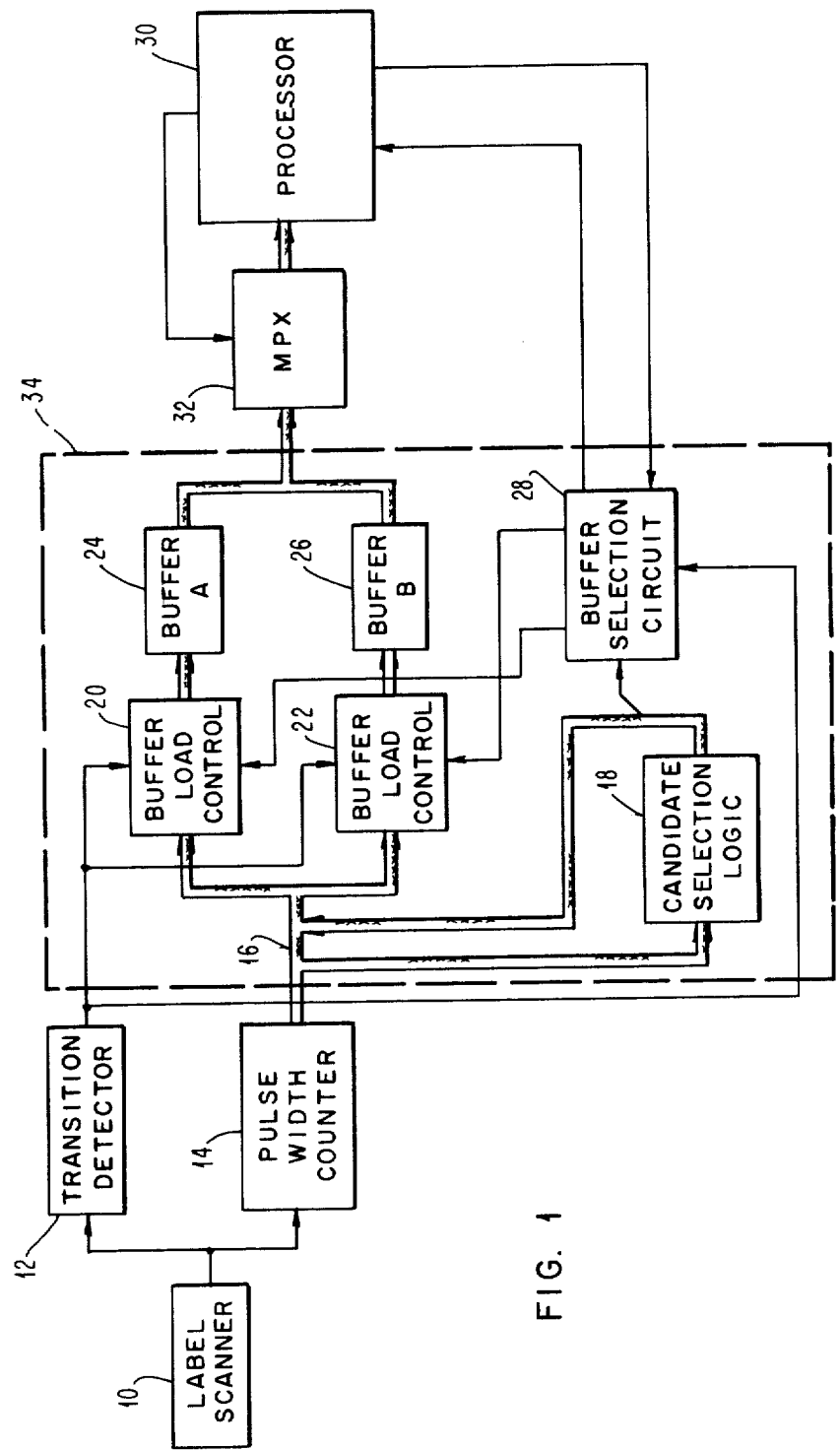
FIG. 1 is a block diagram of a scanning system including the present invention.

Referring to FIG. 1, a label reading system in which the present invention may be used includes a label scanner 10. The scanner 10, which may be conventional in nature, preferably includes a laser beam source, beam deflecting components for generating a scan pattern using the laser beam, signal converting circuitry for producing an electrical signal which varies as a function of the intensity of reflected light as well as thresholding or other pulse shaping circuits for producing a train of square wave pulses from the irregular sinusoidal wave form.

The pulse train generated by the label scanner 10 is applied both to a transition detector 12 and to a pulse width counter 14. The function of transition detector 12 is to provide a timing signal at the leading edge of each positive and negative pulse. The pulse width counter 14 generates a binary word having a value determined by the width of each pulse. Pulse width counter 14 preferably consists of a binary counter driven by a high frequency clock. The binary counter would be enabled at the leading edge of each pulse and disabled at the trailing edge. The count which accumulates would be directly proportional to the pulse width.

The binary signals or words at the output of pulse width counter 14 are applied in parallel over cable 16 to a candidate selection logic circuit 18. The function of circuit 18 is to examine the presented data and to provide a candidate signal at its output whenever a predetermined number of successive words satisfy gross logical tests. Suitable logic selection candidate circuits are known in the art. Examples of such circuits may be found in U.S. Pat. Nos. 3,909,787 and 4,086,477, both of which are incorporated herein by reference. The candidate selection signal generated by circuit 18 is preferably a multibit binary signal which idicates not only that a potential label has been found but also the direction in which the label was scanned. The candidate selection signal is appended to one of the data words being transmitted through cable 16. Because a finite period of time is required to complete the gross logical tests in circuit 18, the candidate selection signal is not appended to the last word of the block of potential label data but instead lags the block by one or more data words. For example, if data words 1 through 20 represented a block of potential label data, the candidate selection signal would be appended to the second word following that block or word 22. The amount of lag is fixed when the system is designed.

The enlarged data word, consisting of the combined outputs from the pulse width counter 14 and candidate selection logic circuit 18, are applied to a pair of buffer load control circuits 20 and 22. The circuits 20 and 22 are described in more detail in reference to a later figure. Generally speaking, the function of each of these circuits is to control the storage of data words presented over cable 16 in either of two, preferably identical, buffer memories 24 and 26. The buffer load control circuits 20 and 22 operate under the control of a buffer selection circuit 28 to direct incoming data to one of the buffer memories 24 and 26 at any given time. The buffer selection circuit 28, details of which will be described later, is in turn controlled by inputs from the candidate selection logic circuit 18 and transition detector 12.

Buffer selection circuit 28 also provides an output signal to a processor 30 when it is determined that one of the buffer memories is fully loaded and contains potential label data. To prevent a loss of any data, the buffer selection circuit 28 simultaneously causes incoming data to be directed to the previously inactive buffer memory. Processor 30 responds to its input from buffer selection circuit 28 by controlling a multiplexer circuit 32 to provide for the transfer of data from the fully loaded buffer memory.

To summarize the operation of the circuit described generally above, incoming data words are directed through one of the buffer load control circuits to an active buffer memory as they are concurrently being examined by the candidate selection logic circuit 18. If the active buffer memory is filled, the oldest data will be replaced by newly received data. When candidate selection logic 18 recognizes that the active buffer memory is full and contains a block of potential candidate data, incoming data words are loaded into the previously inactive buffer memory while the processor 30 is notified to permit it to begin transferring data from the fully loaded buffer memory through the multiplexer 32. The processor 30 then performs a more rigorous analysis of the data to make a final determination whether a label has been detected.

Figure 2:
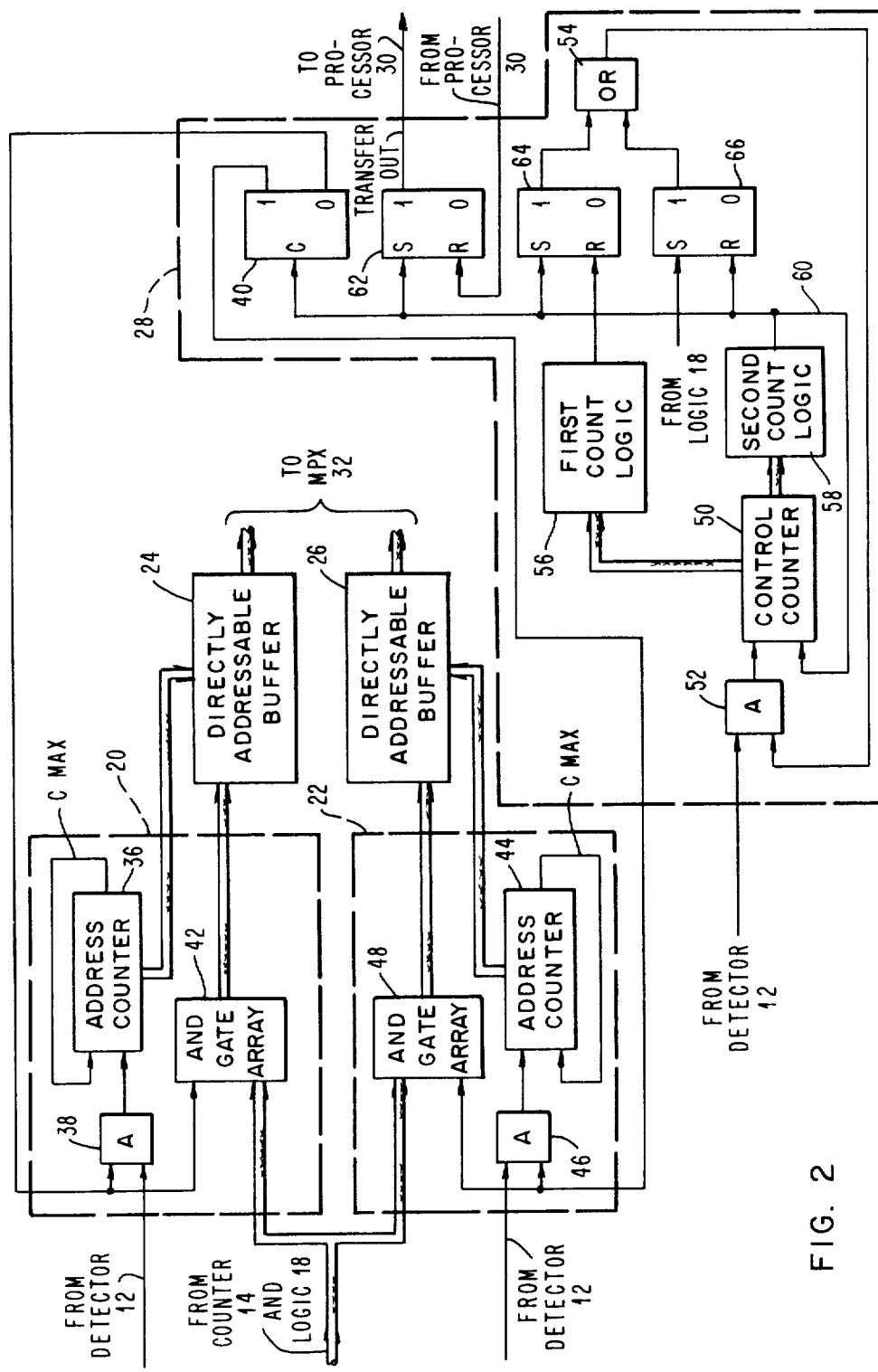
FIG. 2 is a more detailed block diagram of the elements of a buffer memory control circuit constructed in accordance with the present invention.

FIG. 2 is a more detailed block diagram of the buffer storage circuits and the buffer selection circuit 28. FIG. 2 basically encompasses all of the elements contained within the dotted outline 34 in FIG. 1. Signals originating outside of the dotted outline are identified by a reference to the component in which they are generated.

In a preferred embodiment of the invention, the buffer devices 24 and 26 are random access or directly addressable buffer memories having a number of separately addressable storage locations, each capable of storing one multibit word. The number of word storage locations in each buffer is greater than the number of words required to form a label candidate. The load control circuit 20 for the buffer device 24 includes a address counter 36 having a count capacity equal to the number of word storage locations in buffer device 24. The address counter 36 is driven by an output from a dual input AND gate 38. One of the inputs to AND gate 38 is provided by a bistable device, such as a flip flop 40, which is switched between its set and reset states each time a pulse is applied at its clock (C) input. The second input to AND gate 38 is provided by transition detector 12. When flip flop 40 is reset, each detected transition in the signal provided by label scanner 10 causes AND gate 38 to be fully enabled. As a consequene, the address counter 36 is incremented by 1 count to point to a new storage location in buffer 24. The inverted output from flip flop 40 is also applied to each of the AND gates in an array 42. While all of the AND gates in array 42 have a common input from flip flop 40, a second input to each AND gate is provided by one of the conductors in the input cable 16. The AND gate array 42 passes any word provided by pulse width counter 14 and candidate select logic circuit 18 so long as the flip flop 40 is in its reset state. The storage location to which the word is directed depends on the output of address counter 36 at the time.

The load control circuit for the second buffer device 26 is substantially identical to the load control circuit already described. More specifically, the control circuity for buffer 26 includes a self-resetting address counter 44 which is driven by a dual input AND gate 46. The load control circuit similarly includes an array 48 of AND gates in which each AND gate is connected to a different conductor in the cable 16 while having a common connection to flip flop 40.

The only difference between circuits 20 and 22 is that they are controlled by complementary outputs from the flip flop 40. When flip flop 40 is in its reset state, AND gate 38 and the AND gates in array 42 are enabled to permit data to be stored in buffer 24 in sequentially addressed locations. During this time, the AND gates in array 48 and AND gate 46 are inhibited by a low level signal from flip flop 40 to effectively isolate buffer 26 from the incoming data. When the flip flop 40 is in its opposite or set state, the AND gates associated with buffer 26 are enabled, causing incoming data to be stored in sequentially addressed locations in that buffer. At the same time, the AND gates associated with buffer device 24 are inhibited by a low level signal on the inverted output of flip flop 40.

Flip flop 40 is one of the components in buffer selection circuit 28. The state of flip flop 40 is determined by a control counter 50, which preferably is a self-resetting binary counter capable of attaining a maximum count equal to the number of storage locations in each of the buffers 24 and 26. Control counter 50 is clocked with pulses provided by a dual input AND gate 52. One input to AND gate 52 is pulsed each time the transition detector 12 detects the leading edge of either a positive pulse or a negative pulse from the label scanner. The second input to AND gate 52 originates at an OR gate 54 within the buffer selection circuit 28. The conditions under which OR gate 54 provides enabling or inhibiting signals are described in detail later.

Control counter 50 provides outputs both to a first count logic circuit 56 and to a second count logic circuit 58. Both of the circuits 56 and 58 may consist of arrays of AND gates connected to particular stages of the control counter 50 so as to produce positive logic output signals only at the first and second counts, respectively. The function of the first count logic circuit 56 is to recognize that the control counter 50 has attained a count corresponding to a complete block of label candidate data including the lagging candidate selection tag. For example, if a block of label candidate requires the storage of forty words in one of the buffer devices 24 and 26 and if the candidate selection tag lags by two counts, first count logic 56 would be designed to recognize a count of forty-two.

The function of the second count logic circuit 58 is to detect a count corresponding to the maximum word storage capacity of the buffer devices 24 and 26. If each of the buffer devices 24 and 26 has a word storage capacity of 64 multibit words, logic circuit 58 will produce a positive output at a count of 64. A reset loop 60 is used to reset control counter 50 to an initial count (preferably zero) after the second count is detected. The output of second count logic circuit 58 provides the clock input to flip flop 40, a set input to a flip flop 62, a set input to another flip flop 64 and a reset input to still another flip lop 66. As will be explained in more detail later, control counter 50 reaches the second count only when one of the buffer devices 24 and 26 is fully loaded and contains a block of label candidate data. Flip flop 62 responds at the second count to provide an interrupt to processor 30 for initialing the transfer of data from the fully loaded buffer through the multiplexer 32 to the processor. Flip flop 62 is reset by processor 30 when the transfer is complete.

Flip flop 64 is reset by an output from circuit 56 when the first count is reached in control counter 50. and is set by an output from circuit 58 when the second count is reached. As a consequence, flip flop 64 provides a high level signal in its normal output whenever the counter 50 output is between one and the first count. Using the values given above as examples, flip flop 42 provides a high level signal in its nornal output at all counts from one through 42 and a low level signal on its normal output at all counts from 43 through 64. The normal output of flip flop 64 provides one of the inputs to OR gate 54.

Flip flop 66 is set whenever candidate select logic circuit 18 recognizes a block of label candidate data and is reset at attainment of the second count. The amount of time during which flip flop 66 is set or reset is indefinite and may vary widely from one cycle of operation to the next, dependingly solely on when a label candidate is recognized.

Generally speaking, the logic components associated with control counter 50 allow that counter to be driven only to the first count when no label candidates have been found. The counter is held at the first count while incoming signals continue to be loaded into the active buffer. When candidate selection logic 18 recognizes a label candidate, the counter 50 is incremented once for each incoming word until the second count is reached. At the second count, flip flop 40 is switched to direct subsequently received words to the previously inactive buffer device. Flip flop 62 is set to provide a signal to processor 30 which causes data to be read out from the fully loaded buffer device through the multiplexer 32.

Figure 3:
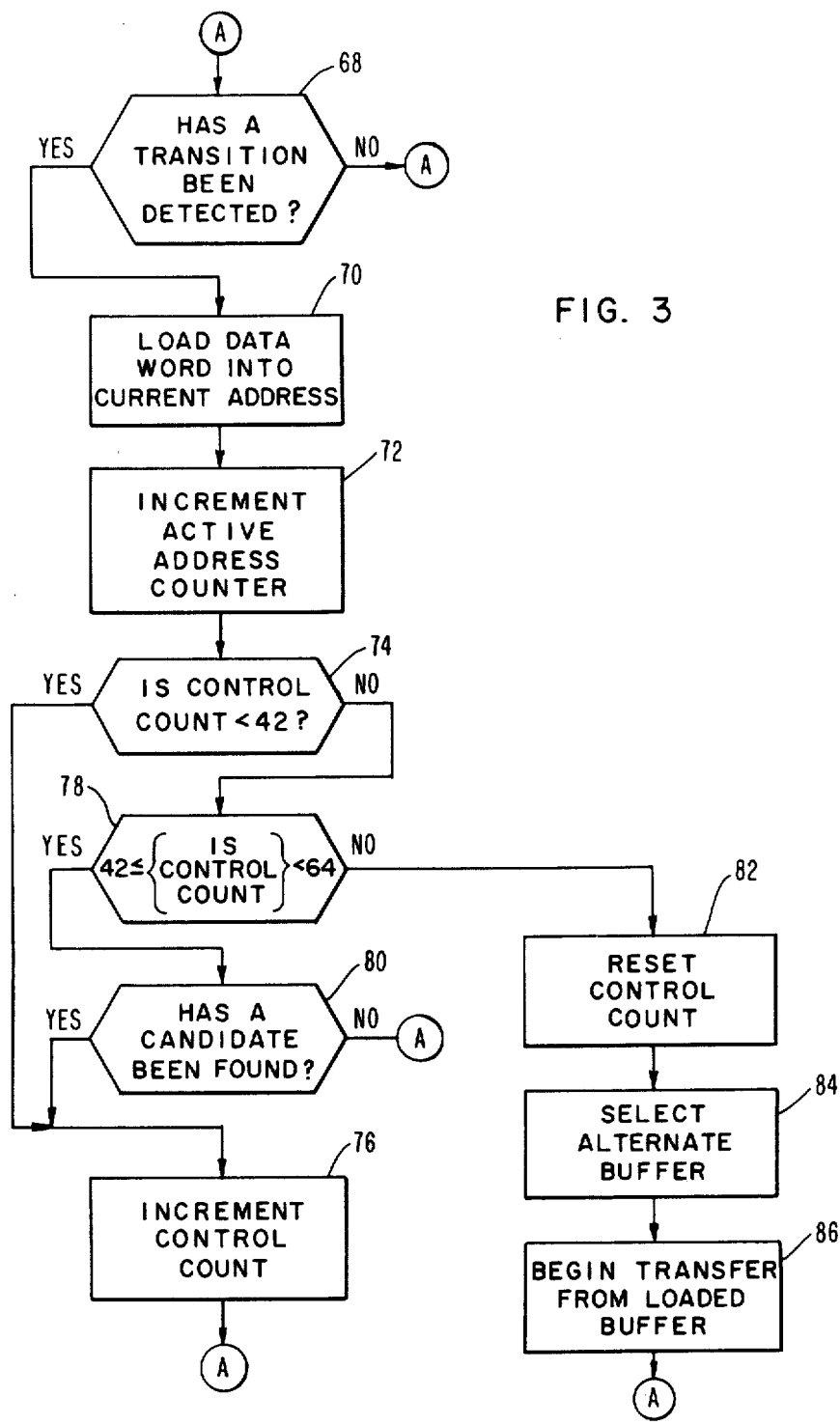
FIG. 3 is a flow chart which is useful in explaining the operation of the buffer memory control circuit.

This mode of operation is described more fully with reference to the flow chart shown in FIG. 3.

To help describe the operation of the circuit, certain initial conditions are assumed. First, it is assumed that the maximum word storage capacity of each of the buffer devices 24 and 26 is 64 words, which also corresponds to the second or maximum count attainable in control counter 50. It is further assumed that a block of label candidate data consists of forty words and that the candidate selection tag lags that block by two words, making the first count equal to 42. Flip flop 40 is initially reset so that AND gate 38 and the AND gates in array 42 are partially enabled. Address counter 36 is initially set to 1 to address the first word storage location in buffer device 24.

When the circuit is powered up, transition detector 12 continually looks (block 68) for a transition. Until a transition is detected, nothing happens. When the transition is detected, the incoming word is transmitted (block 70) through AND gate array 42 to the first storage location in buffer device 26. The detected transition is also transmitted through AND gate 38 to the address counter 36 (block 72) to increment the address count by 1.

If the control count is less than 42 (block 74), the control counter is incremented by 1 and the process begins again. After the first transition, both the control counter 50 and the address counter 36 will be at 1 and one word will be stored in buffer device 24.

The routine described above will be repeated for each transition in the incoming signal until it is determined at block 74 that the control count is at least equal to 42. When that happens, a second decision is made (block 78) as to whether the control count is greater than or equal to 42 but less than 64. If the count is within this range, a check must be made (block 80) as to whether a label candidate has been found. If no label candidate has been located, the routine is started again. If, however, a label candidate has been found during the current counting cycle (that is, from count 1 to the current count) the control counter block 76 is incremented before the routine starts over.

The described steps will be iterated until the check at block 78 indicates that the control count is equal to 64. At a count of 64, which indicates a fully loaded buffer containing at least some candidate data words, the control count is reset to 1 (block 82) through the reset loop 60. Flip flop 40 is set to enable the load control circuit 22 for buffer device 26 (block 84). At the same time flip flop 62 is set, providing a signal to processor 30 which results in the transfer of data (block 86) from the fully loaded buffer device 24.

The buffer loading cycle will be iterated as described whether buffer 24 or buffer 26 is the active memory device. On thing should be noted. While the control counter 50 will be inhibited or held at a count of 42 unless a candidate select pulse is generated before counter 50 reaches that count, data words will continue to be written into the buffer device 26 in cyclical fashion with the newest data being written into the storage location holding the oldest data. The control counter 50 is enabled to count beyond 42 only when a candidate selection pulse is generated during the current control count cycle.

In the flow chart, it is assumed for ease of discussion that all operations are performed sequentially. This assumption would be accurate if the invention were to be implemented by programming a general purpose processor, which is certainly within the scope of the invention. However, when the invention is implemented in the form of hardware elements, the operations may be concurrent rather than sequential. For example, the checks on control counts performed on blocks 74 and 78 would be sequential in a programmed system but concurrent in a system made up of hardware elements.

FIG. 4 shows the incoming words, a candidate selection pulse and the counts in the control counter 50 and buffer address counter during a single buffer loading cycle. In FIG. 4, each positive pulse can be assumed to represent a black bar in a bar-coded label while each negative pulse can be assumed to represent a white bar (or space) in the same label. The control count and the buffer address count for the selected buffer follow the number of data words received until the control count reaches the first count or 42. If no candidate selection pulse has been generated by that time, both inputs to OR gate 54 go low, causing that OR gate to inhibit AND gate 52, which prevents any further pulses from being applied to control counter 50. The address counter for buffer 24 will continue to be incremented at each transition to allow the oldest data in the buffer device to be overridden by the newest incoming data.

When a candidate selection pulse is finally generated, flip flop 66 is set to drive the output of OR gate 54 to a high or enabling level. The control counter 50 then resumes counting transitions, beginning with the count of 42. Until the control count reaches 64, incoming data words continue to be applied to the buffer device with the oldest stored words being overwritten. At a count of 64, flip flop 40 is toggled to provide an enabling signal to the AND gates associated with the previously inactive buffer device 26 while an inhibiting signal is applied to the AND gates associated with the now fully-loaded buffer device 24. The address counter for buffer 26 will have been set to 1 either during start up or following the last dump of the buffer contents to the processor 30. The control counter will also be reset to 1 by the signal provided through its reset loop 60. Because of this, the control count and the buffer address count track one another as the first 42 words of data are applied to buffer device 26. As buffer device 26 is being loaded, the contents of buffer device 24 are transferred to the processor 30 through the multiplexer 32.

The storage control process as it applies to buffer 26 is substantially identical to that described for buffer 24. The control counter 50 will count to and hold at a count of 42 unless the candidate selection logic circuit 18 sets flip flop 66 at a word count somewhere between 1 and 42 to indicate that the buffer device being loaded contains label candidate data. If no candidate selection tag is generated by circuit 18 during the first 42 counts, the control counter 50 will hold at that count even though data words continue to be written into the buffer device 26 with the newest words replacing the oldest words. Counting resumes only when a candidate selection pulse sets flip flop 66.

The advantage of the two buffer arrangement is clear. The processor 30 is interrupted to provide decoder service only when one of the buffer devices is fully loaded and has been found to contain label candidate data. No interrupt occurs if a fully loaded buffer contains no label candidate data or if a partially loaded buffer contains label candidate data. Also, the ability to divert incoming data to an alternate buffer device when the first buffer device has been found to contain label candidate data, assures that no data will be lost even though there may be overlapping or nested label candidates.

While there have been described what are considered to be preferred embodiments of the invention, variations and modifications therein will occur to those skilled in the art once they become acquainted with the basic concepts of the invention. Therefore, it is intended that the appended claims shall be construed to include both the preferred embodiment and all such variations and modifications as fall within the true spirit and scope of the invention.

What is claimed is:

1. A data storage control circuit including:
    a plurality of data storage devices for storing serially-received units of incoming data;
    gating means for connecting a selected one of said devices to a source of incoming data units;
    a counter connected to the source, said counter having a maximum count capacity related to the storage capacity of each of said data storage devices;
    candidate select logic means connected to the source for generating a candidate signal when a first number of serially-received data units satisfies predetermined criteria;
    counter control means connected to said counter and to said candidate select logic means for enabling said counter to count each data unit up to the first number and to count each unit beyond the first number only when a candidate signal has been generated during the current count cycle; and
    switching means connected to said counter and responsive to attainment of the maximum count therein for causing said gating means to direct subsequently received data units to a different one of said data storage devices.

2. A data storage control circuit as defined in claim 1 wherein each of said data storage devices comprises:
    a random access memory connected to said gating means and having a number of directly addressable storage locations equal to the maximum count, each of said storage locations being adapted to store a multi-bit binary word; and
    an address counter for sequentially addressing said storage locations, said address counter being selectively enabled by an output of said switching means.

3. A data storage control circuit as defined in claim 2 wherein the gating means and the address counter associated with a particular random access memory are selectively enabled by the same output from said switching means.

4. A data storage control circuit as defined in claim 3 wherein said counter control means comprises:
   a dual input AND gate having a first input connected to the data units source, a second input and an output connected to the clock input of said counter;
   counter recognition logic for providing a first signal when the counter reaches the first number and a second signal when the counter reaches the maximum count;
   a first bistable device having a set input for receiving the second signal, a reset input for receiving the first signal, and a normal output;
   a second bistable device having a set input from the candidate select logic means, a reset input for receiving the second signal and a normal output; and
   a dual input OR gate for receiving the normal outputs from said first and second bistable devices, the output of said OR gate being connected to the second input of said AND gate.

5. A data storage control circuit including:
   a plurality of data storage devices for storing serially-received units of incoming data;
   gating means for connecting a selected one of said devices to a source of incoming data units;
   a counter connected to the source;
   candidate select logic means connected to the source for generating a candidate signal when a first number of serially-received data units satisfies predetermined criteria;
   counter control means connected to said counter and to said candidate select logic means for enabling said counter to count each data unit up to the first number and to count each unit beyond the first number only when a candidate signal has been generated during the current count cycle; and
   switching means connected to said counter and responsive to attainment of a second predetermined count therein for causing said gating means to direct subsequently received data units to a different one of said data storage devices.

6. A data storage control circuit as recited in claim 5 wherein said switching means comprises:
   a plurality of logic gate arrays, each of said arrays having common inputs from the data units source, outputs connected to only one of the data storage devices, and a control input for selectively enabling the gates to pass input data;
   a multi-output device responsive at the second count for providing an enabling control input to a previously inactive array while terminating the control input to the previously active array.

7. A data storage control circuit as recited in claim 5 wherein said counter further comprises a selfresetting, fixed cycle counter capable of attaining a maximum count equal to the second count.

8. A data storage control circuit as recited in claim 7 wherein said switching means comprises:
   a plurality of logic gate arrays, each of said arrays having common inputs from the data units source, outputs connected to only one of the data storage devices, and a control input for selectively enabling the gates so as to pass data;
   a multi-output device responsive at the second count for providing an enabling control input to a previously inactive array while terminating the control input to the previously active array.

9. A data storage control circuit as recited in claim 8 wherein each of the data storage devices has a number of storage locations equal to the value of the second count and wherein previously stored data units are replaced by newly received data units so long as the count in said counting means is equal to or less than the second count.

* * * * *